United States Patent
First et al.

(10) Patent No.: US 7,340,594 B2
(45) Date of Patent: Mar. 4, 2008

(54) BIOS-LEVEL INCIDENT RESPONSE SYSTEM AND METHOD

(75) Inventors: Carl L. First, Gilroy, CA (US); Morris E. Jones, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 10/882,056

(22) Filed: Jun. 30, 2004

(65) Prior Publication Data

US 2006/0005004 A1   Jan. 5, 2006

(51) Int. Cl.
*G06F 9/00* (2006.01)
*G06F 9/24* (2006.01)
*G06F 15/177* (2006.01)

(52) U.S. Cl. ............... 713/2; 713/1; 713/100
(58) Field of Classification Search ............. 713/2
See application file for complete search history.

(56) References Cited

U.S. PATENT DOCUMENTS 5,748,877 A    5/1998  Dollahite et al.
5,862,308 A *  1/1999  Andress et al. ............. 714/10
5,884,073 A *  3/1999  Dent ............................ 713/2
6,622,192 B2 * 9/2003  Chou et al. ................. 710/260
6,651,165 B1  11/2003  Johnson
6,931,522 B1 * 8/2005  Raghavan et al. ........... 713/2
2003/0070115 A1 * 4/2003  Nguyen et al. ............. 714/23
2003/0212936 A1 * 11/2003 Neuman et al. ............ 714/723
2004/0064761 A1 * 4/2004  Harrington et al. .......... 714/43
2005/0132360 A1 * 6/2005  Chu et al. .................. 717/177
2005/0160217 A1 * 7/2005  Gonzalez et al. ............ 711/6

* cited by examiner

*Primary Examiner*—James K. Trujillo
*Assistant Examiner*—Michael J Brown
(74) *Attorney, Agent, or Firm*—Schwabe, Williamson & Wyatt, P.C.

(57) ABSTRACT

A system, apparatus, and method for depicting and responding to systematic problems and/or incidents in computing devices at a Basic Input/Output System level are described herein.

24 Claims, 7 Drawing Sheets

BIOS-LEVEL INCIDENT RESPONSE SYSTEM AND METHOD

FIELD OF THE INVENTION

The present invention relates to the field of data processing. More specifically, the present invention is related to BIOS (Basic Input/Output System) level responses to hardware and/or software events in computing devices.

BACKGROUND

Advances in microprocessor and related computing technologies have lead to widespread deployment and adoption of computing devices. Computing powers that used to be available only in very expensive mainframe computers requiring air conditioned operating environments, are now available on many personal computing devices. Their form factors may vary from desktop, laptop, palm sized and so forth. A number of these computing devices are packaged as "special purpose" devices such as set top boxes, entertainment control centers, personal digital assistants ("PDA"), pagers, text messengers and wireless mobile phones.

Concurrently, advances in the complexity of the circuitry of computing devices and the software operating on these computing devices have lead to an increase in the level of possible errors and conflicts that may create unexpected incidents and/or events when utilizing computing devices. To respond to these incidents, software and hardware producers have developed reporting mechanisms such that users are informed of the existence of an unexpected incident. For example, in the boot sequence of a conventional computing device a power on self test ("POST") code may generate as a series of beeps to indicate a particular hardware failure. Similarly, a software instruction that erroneously writes data to a protected portion of a computer's memory may generate an event in an operating system log.

However, these reporting mechanisms are deficient in a number of ways. POST codes are generally unintelligible to the majority of computer users, and operating system events that are logged are only effective so long as the operating system is operational and accessible. Systemic problems and/or incidents caused outside the operating system fail to be recorded and/or reported to a user in an intelligible manner.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Illustrative embodiments of the present invention include, but are not limited to, systems and methods that allow a computing device to respond to recorded incidents at a BIOS level, independent of any operating system and any programs running above the operating system level.

Various aspects of the illustrative embodiments will be described using terms commonly employed by those skilled in the art to others to convey the substance of their work to others skilled in the art. However, it will be apparent to those skilled in the art and others that the present invention may be practiced with only some of the described aspects. For purposes of explanation, specific numbers, materials and configurations are set forth in order to provide an understanding of the illustrative embodiments. However, it will be apparent to one skilled in the art and others that the present invention may be practiced without the specific details described below. In other instances, well known features are omitted or simplified in order not to obscure the illustrative embodiments.

Furthermore, various operations and/or communications will be described as multiple discrete operations and/or communications, in turn, in a manner that is helpful in understanding the embodiments of the present invention; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Embodiments of the present invention which have protective and/or preventative shut down aspects are capable of determining current or future incidents (e.g., maintenance and/or failure conditions) and set one or more boot flags for a BIOS to examine. The one or more boot flags may indicate to the BIOS that action(s) should be taken on the next start up of the computing device. The BIOS can retrieve stored messages and any instructions for the user from a BIOS-accessible memory where incident information was stored.

This BIOS-accessible memory may be stored within the BIOS or in a non-BIOS memory (such as an option or flash memory) and contain plain language instructions on recovery actions and/or response actions to the incident. Furthermore, in addition to instructions to a user, the BIOS-accessible memory may include executable instructions for responding to an incident.

The stored incident information allows the end-user of a computing device to be informed of the reasons for the incident (such as why a computing device shut down) and what actions, if any, need to be taken. If reconfiguration of the BIOS settings and/or other settings of the computing device is required, this information can be presented to the end-user.

All recovery information provided to the end-user can be provided via a central management system for use in an enterprise wide maintenance. However, it may be desirable to store information locally on the computing device if the BIOS would not have access to a centralized storage independent of operating system functionality. In some embodiments the BIOS-accessible memory will always be on the computing device as this will allow the BIOS to respond to incidents even if network access is interrupted. However, if corrective action to the incident requires booting from a remote server or other maintenance device, this may be initiated on the next start up of the computing device in some embodiments.

When an unexpected (autonomic) shut down of a computing device occurs, an end-user will mostly likely try to restart the computing device. This allows the BIOS of the computing device to inform the user of the cause of any shut down or other incident, and take corrective action if possible. If corrective action is required by the BIOS (such as booting a clean software image from the network) or if there is a hardware problem that will not allow the current operating system to operate correctly, but the machine may continue operating with an alternate operating system and/or resources, corrective actions can be taken on the next startup of the computing device and the user may continue operation of their computing device. In various embodiments of the present invention, the user will be provided with sufficient information to understand what type of maintenance and/or corrective action is required to continue operation and/or correct the operation of their computing device.

Figure 1:
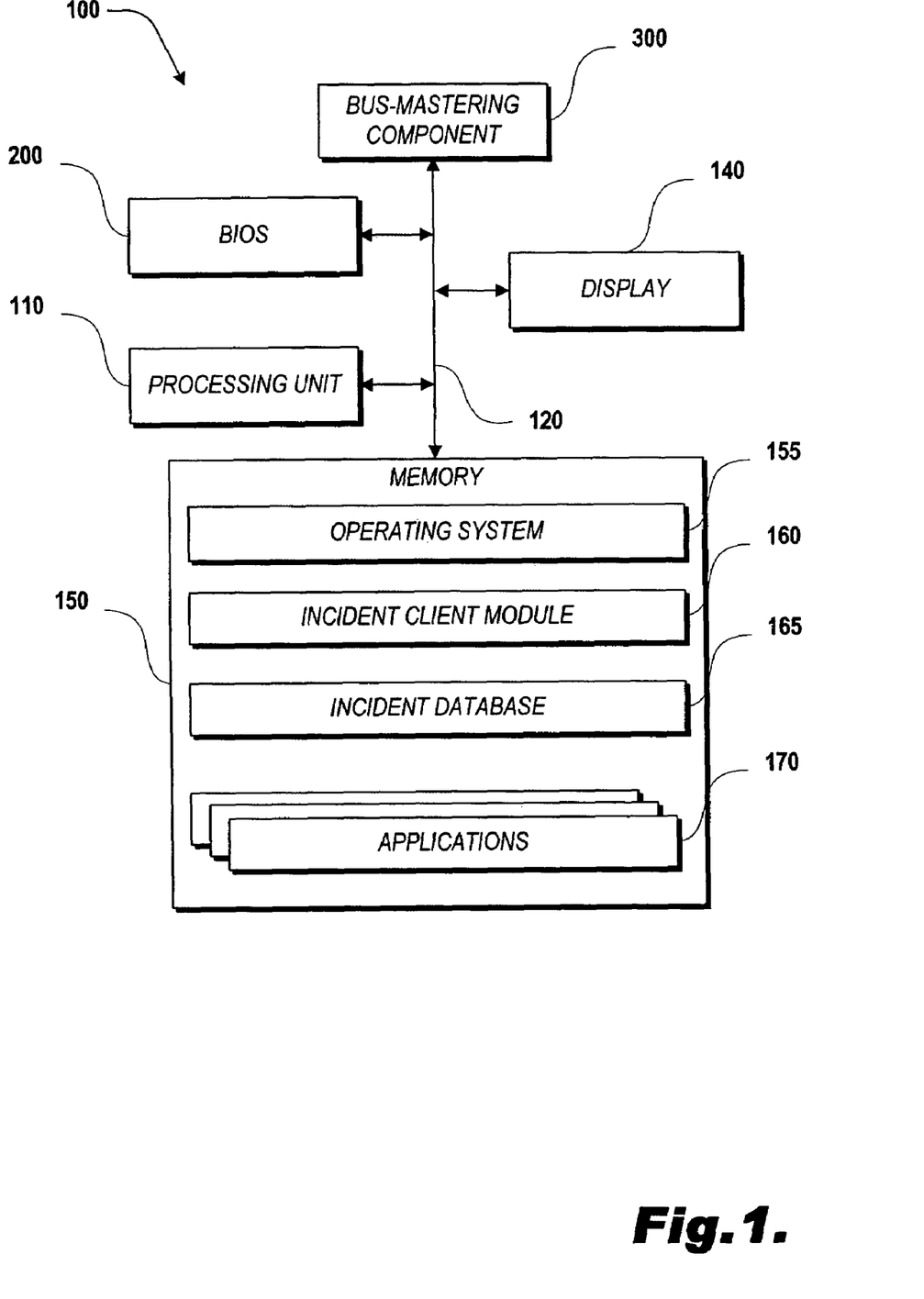
FIG. 1 illustrates an architectural view of a device suitable for use as a computing device in accordance with one embodiment.
Figure 3:
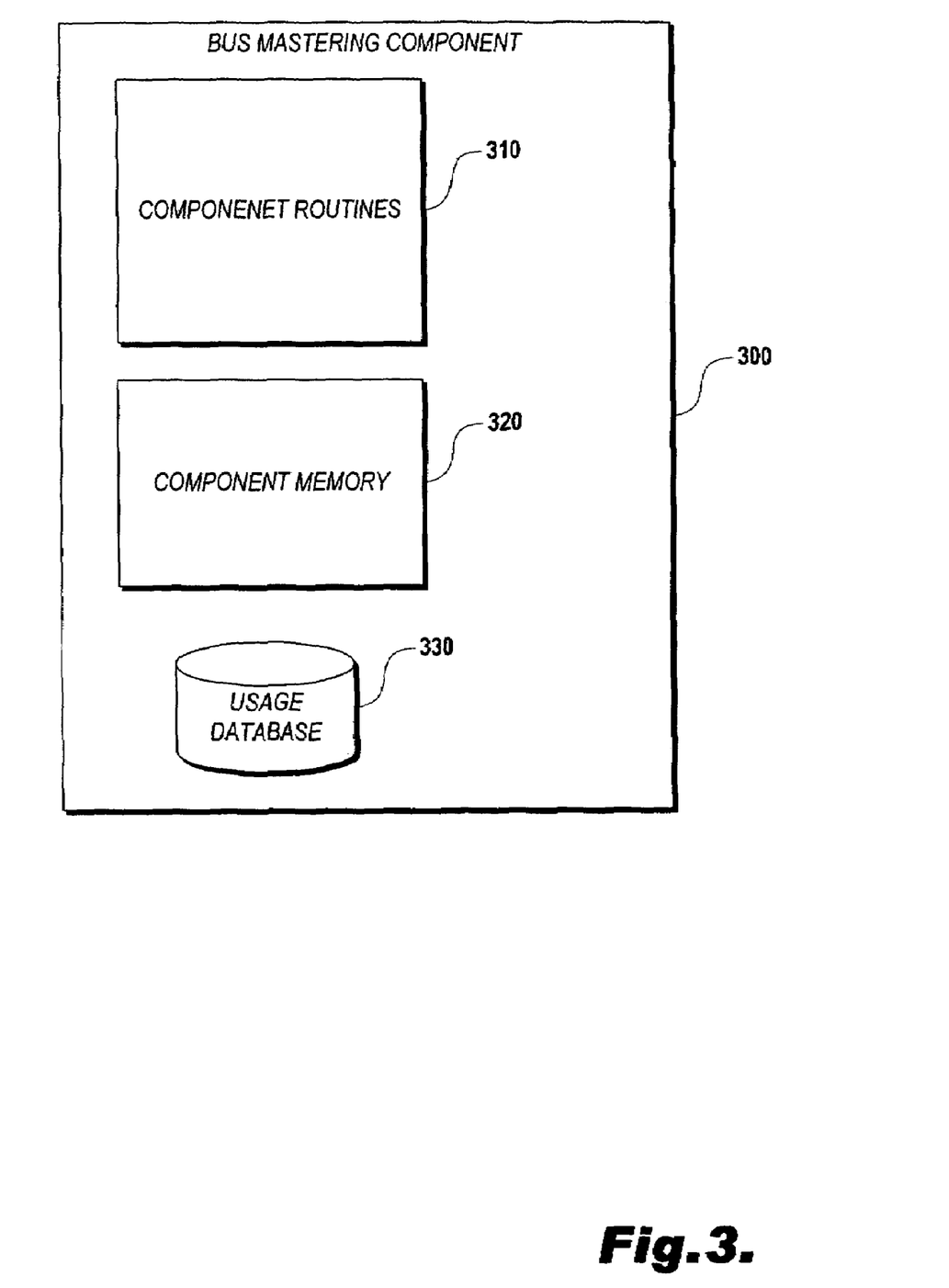
FIG. 3 illustrates an architectural view of an exemplary bus mastering component of a computing device such as the computing device shown in FIG. 1, in accordance with one embodiment.

FIG. 1 illustrates an exemplary computing device 100 suitable for use in embodiments of the present invention. In alternate embodiments, the computing device 100 may include many more components than those shown in FIG. 1. However, it is not necessary that all of these generally conventional computing components be shown in order to disclose an enabling embodiment for practicing the present invention. In some embodiments, computing device 100 may contain fewer components. As shown in FIG. 1, the computing device 100 includes a bus mastering component 300, which in some embodiments of the present invention may be a communications interface such as a network interface controller ("NIC"). Bus mastering component is shown in FIG. 3 and described below. In such embodiments where the bus mastering component 300 is a communications component, the communications may be designed to support a local area network, wide area network, personal area network, telephone network, power line connection, serial bus or wireless connection. Such a bus mastering component 300 would also include the necessary circuitry, driver and/or transceiver for such a connection and would be constructed for use with the appropriate protocols for such connections.

The computing device 100 also includes a processing unit 110, a display 140, a memory 150 and a BIOS 200 (shown in FIG. 2 and described below), all interconnected along with the bus mastering component 300 via a bus 120. The memory 150 generally comprises random access memory ("RAM"), a read only memory ("ROM") and a permanent mass storage device, such as a disk drive, flash RAM or the like. The memory 150 stores an operating system 155, an incident client module 160, an incident database 165 and one or more applications 170. While the operating system 155, incident client module 160, incident database 165 and applications 170 are described as separate software components, in alternate embodiments, they may actually be comprised of multiple software components; or may be subparts of one or more integrated software components. Likewise, bus 120 may included multiple buses or bus segments bridged by bus bridges.

The software components may be loaded from a computer readable medium into memory 150 of the computing device 100 using a network mechanism (not shown) associated with the computer readable medium, such as a floppy, tape, DVD (Digital Versatile Disk) or CD (Compact Disk) drive, flash RAM or NIC.

Although only one bus mastering component 300 is shown, more than one bus mastering device 300 may optionally be included in the computing device 100. In various embodiments, such bus mastering components may facilitate the connection of remote devices to the computing device 100, for example, devices for reading and/or writing in machine readable medium, digital cameras, printers, digital music players/recorders such as MP3 players, etc. Various input devices may also be coupled to the computing device 100, such as, for example, keyboards and/or mice (not shown).

Figure 2:
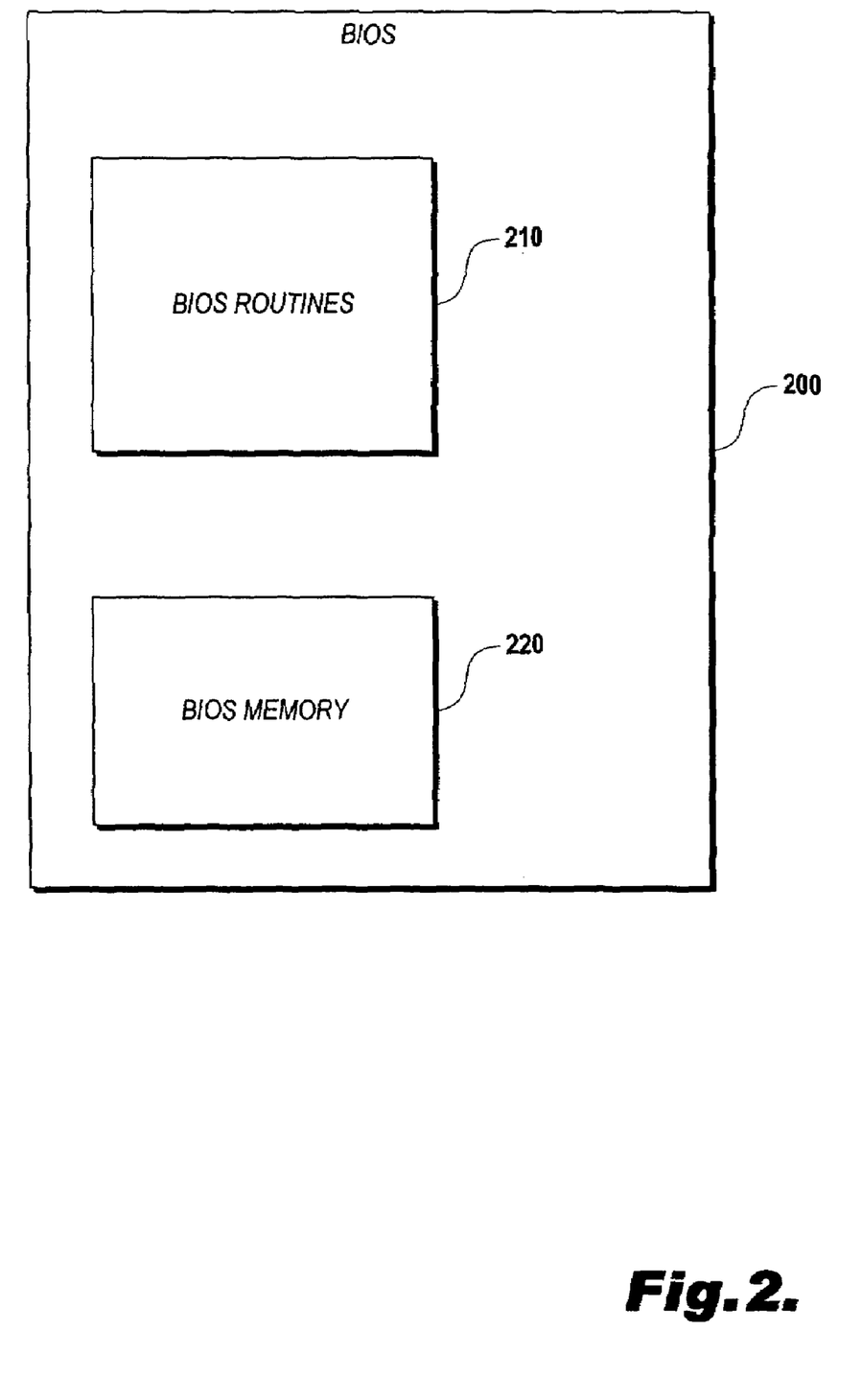
FIG. 2 illustrates an architectural view of a BIOS component of a computing device such as the computing device shown in FIG. 1, in accordance with one embodiment.

FIG. 2 illustrates one exemplary embodiment of a BIOS component 200 containing BIOS routines 210 and BIOS memory 220. In accordance with one embodiment, messages stored in response to incidents in the computing device 100 are stored in the BIOS memory 220 as one form of BIOS-accessible memory In alternate embodiments, other forms of BIOS-accessible memory that may be employed in various embodiments.

FIG. 3 illustrates a simplified block diagram of a bus mastering component 300 containing component specific routines 310, a component memory 320 and a usage database 330. In alternate embodiments, the component's memory 320 may be another form of BIOS-accessible memory suitable for storing messages and/or executable instructions for responding to incidents in a computing device 100. The usage database 330 is a database for storing usage information about one or more components and system information of the computing device 100. In some embodiments, the usage database 330 may be optional and/or may be stored in alternate locations and/or components of the computing device 100. In one such alternate embodiment, the usage database may be stored in a BIOS memory location such as BIOS memory 220.

In some embodiments, bus mastering component may operate independent of other components of the computing device 100. For example, a bus master NIC with awake-on-LAN, other communications wakeup call functionality could be used to remotely update BIOS-accessible memory instructions and messages in an enterprise network.

Figure 4:
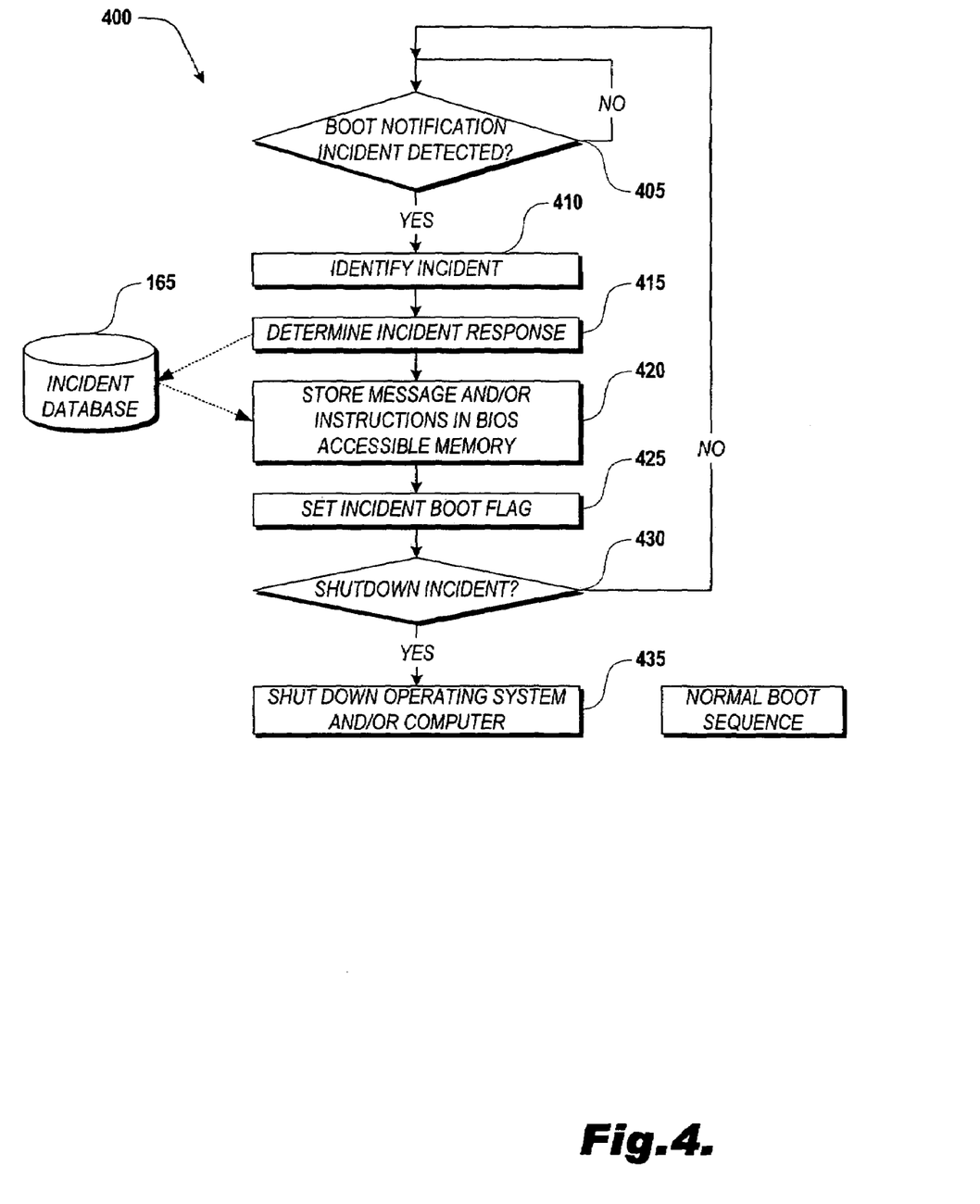
FIG. 4 illustrates an exemplary flow diagram of a process for detecting an incident in accordance with one embodiment.

FIG. 4 illustrates an exemplary flow diagram illustrating aspects of the operation of an incident client module 160, in accordance with one embodiment. The exemplary process 400 begins at decision block 405 where a determination is made whether a boot notification incident has been detected. A boot notification incident is any incident that is of sufficient significance to utilize the boot notification and/or response aspects of embodiments of the present invention. What constitutes sufficient significance may vary from implementation to implementation. If in decision block 405 no boot notification incident was detected, processing continues back to decision block 405 until a boot notification incident is detected, at which point processing continues to block 410 where the incident is identified. Next, in block 415 an appropriate incident response is determined. The determination of an incident response may involve a query to the incident database 165 and then storage (block 420) of the appropriate response, such as a message and/or instructions to a BIOS-accessible memory. Processing then continues to block 425 where an incident boot flag is set. Next, in decision block 430 a determination is made whether the incident was a shut down incident and, if so, processing continues to block 435 where the current operating system and/or computing device is shut down. If, however, at decision block 430 it was determined the incident was not a shut down incident (e.g., was not of such a critical nature that required that the current operations of the computing device 100 be interrupted), processing continues back to decision block 405 and continues as before. Similarly, whether an incident is to be considered critical may vary from implementation to implementation.

Figure 5:
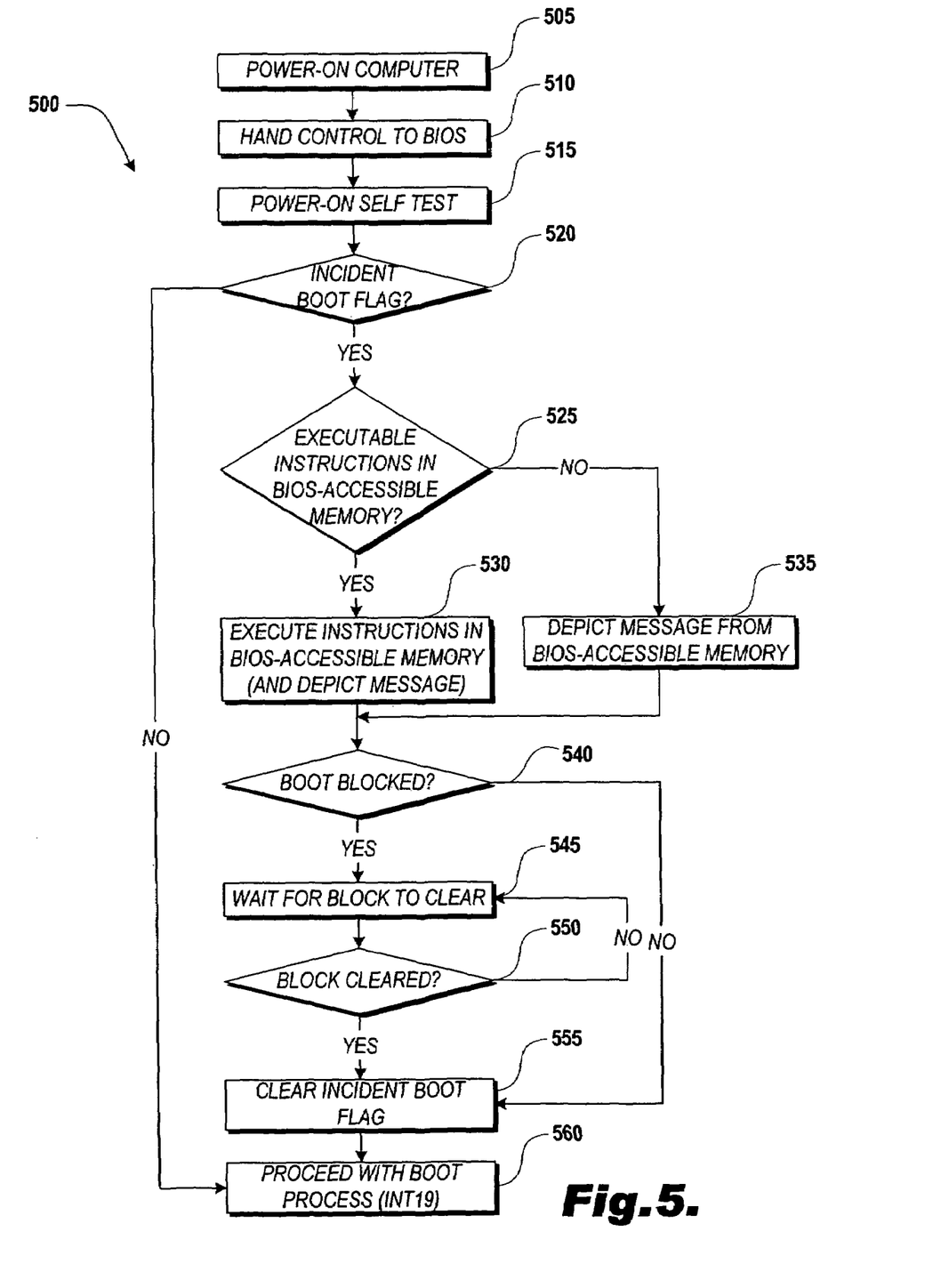
FIG. 5 illustrates an exemplary flow diagram of a process for booting a computing device in accordance with one embodiment.

In accordance with the above described incident detection process 400, FIG. 5 illustrates an incident handling process 500 that a computing device 100 undergoes during a boot sequence, in accordance with one embodiment. Accordingly, process 500 begins at block 505 with the computing device being powered on (or reset). In block 510 the control of the computing device is handed off to the BIOS which in block 515 begins the power-on self test. Next, the determination is made whether an incident boot flag is present in decision block 520. If no incident boot flag is present, processing continues with the boot process as normal, eventually processing to e.g. "interrupt 19" that hands off the boot sequence from the BIOS 200 to the operating system 155, as shown in block 560. If, however, in decision block 520 it was determined that an incident boot flag is present, processing continues to decision block 525 where a determination is made whether there are executable instructions in BIOS-accessible memory and, if so, proceeds to block 530 where the instructions in the BIOS-accessible memory are executed and any resulting and/or related messages are depicted for the user of the computing device 100. If, however, in decision block 525 no executable instructions were determined to be in BIOS-accessible memory, processing would continue to block 535 where a message from the BIOS-accessible memory is depicted (visually or audibly) for the edification of the user of the computing device 100. In any case, after executing instructions and/or depicting messages from the BIOS-accessible memory, processing continues to decision block 540 or a determination is made whether the boot process has been blocked. The boot process may be blocked when the incident is of such a nature that it requires certain actions and/or criteria to be performed and/or present before continuing with the boot process. Similarly, where an incident should block the boot process may vary from implementation to implementation.

An illustrative scenario describing one application of embodiments of the present invention may help to illustrate how embodiments of the present invention may be employed as a security feature in an enterprise environment. The incident client module 160 may be configured to always set an incident flag during the operation of the computing device 100 such that the BIOS checks BIOS-accessible memory upon each booting of the computing device 100. Accordingly, the BIOS-accessible memory is provided with instructions to block the booting of the computing device 100 if a specific enterprise network and/or device is not accessible to the BIOS 200 of the computing device 100. Accordingly, utilizing one such embodiment of the present invention would allow enterprises to secure their computing devices from operation outside of the enterprise network (not shown). The above described scenario is merely presented to aid in the understanding of various embodiments of the present invention and in no way is meant to be limiting to either the spirit or scope of the present invention.

Continuing with process 500, if in decision block 540 it was determined that the boot process was blocked, processing continues to block 545 which waits for the boot block to clear. In decision block 550, a determination was made whether the boot block was cleared and, if not, continues back to block 545 to wait for the block to clear. Once decision block 550 determines that the boot block has cleared or, in any case, if in decision block 540 it was determined that there was no boot block, processing continues to block 555 where the incident boot flag is cleared and in block 560 the boot process proceeds. In various embodiments, the boot process may be aborted if the block was not cleared after a period of time.

Further embodiments of the present invention may include a proactive monitoring element for detecting incidents in a computing device 100. For example, a bus mastering component, such as an NIC, will receive information from the other components of the computing device 100 and track component usage as a history. This history may be stored in a usage database 330 directly, in a condensed form or as a trend over time (e.g., through curve fitting mechanisms) or as raw data for later analysis. The usage data may be analyzed by the bus mastering device and based on rules, preventative or corrective action may be taken.

As NICs and some other bus mastering devices are operating system independent, corrective action may be taken whether or not the operating system is functional. In some embodiments corrective action may be taken by end-users and/or administrative users, however, in various embodiments of the present invention the bus mastering device 300 may be adapted to initiate corrective actions without user intervention. Corrective actions may include restoring operation system components or a BIOS to a functional state. This automated and operating system independent corrective action reduces the cost of maintaining computing devices 100 and improves users' experience of operating such computing devices.

Figure 6:
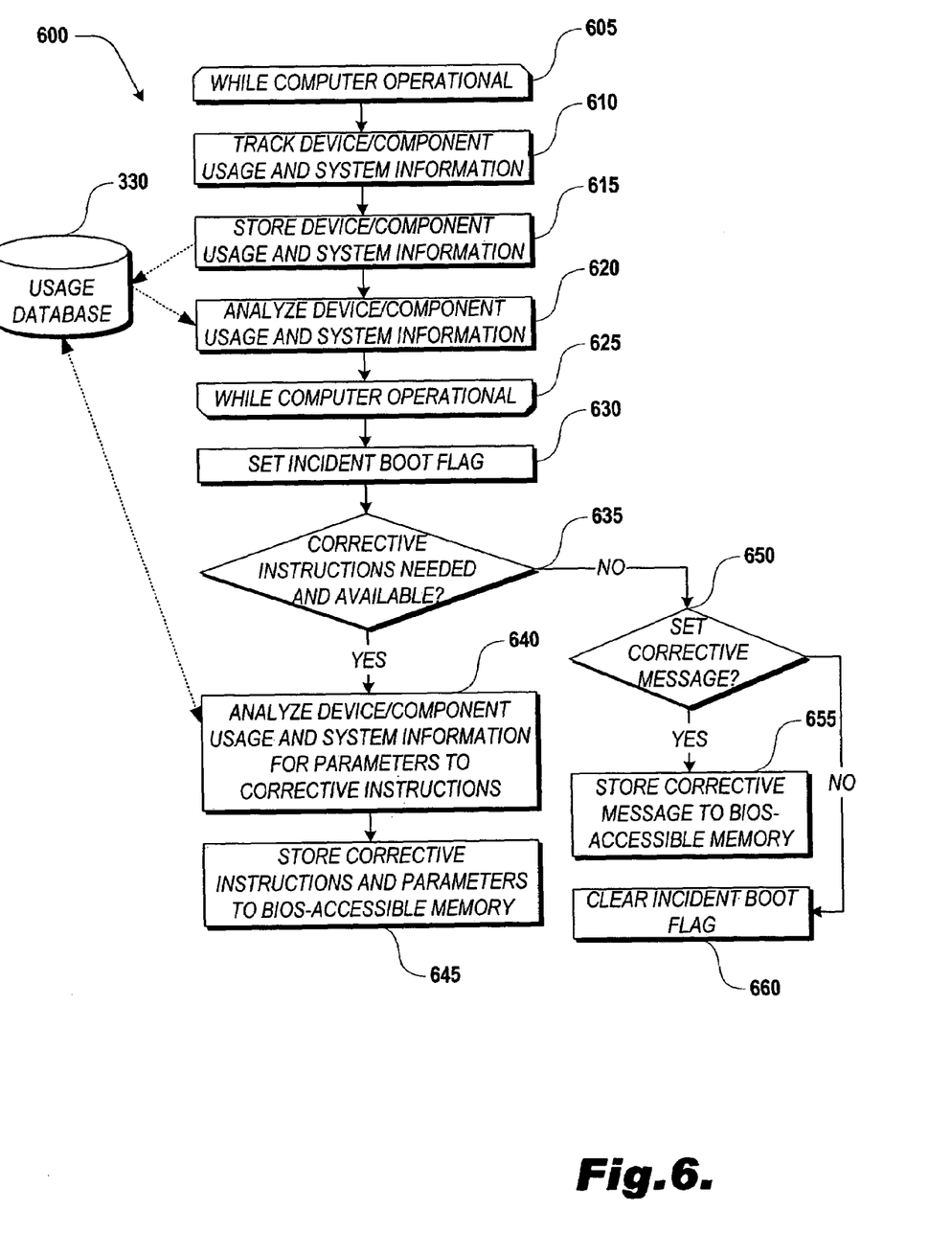
FIG. 6 illustrates an exemplary flow diagram of a process for tracking usage data and responding to an incident in accordance with one embodiment.

FIG. 6 illustrates an exemplary process 600 for monitoring usage data and preparing to respond to detected incidents, such as from incident client module 160. Note, in one embodiment of the present invention the routine indication to shut down a computing device 100 may be labeled as an "incident" for purposes of various embodiments. Usage tracking process 600 begins at looping block 605 which begins a loop during the continued operation of the computing device 100. Next, in block 610 device and/or component usage as well as system information is tracked. In block 615 the device/component usage and system information is stored in the usage database 330 and in optional block 620 the device and component usage and system information is analyzed. In some embodiments of the present invention, the device and component usage and the system information is continually analyzed during the operation of the computing device 100 to look for any incidents or other response worthy situations. However, in some embodiments, such analysis does not occur at this point of process 600. Next, in looping block 625 processing cycles back to looping block 605 until the computing device is no longer operational. For purposes of various embodiments a computing device no longer being operational generally involves either an exception, error, bug, shut down sequence or other disruptive event to the operation of the computing device 100. In block 630, either with the cooperation of any remaining computing device functionality or independent of the operating system and at the BIOS level, an incident boot flag is set. Some incidents may be of such catastrophic nature that merely setting the boot flag is all that may be accomplished during the disruption of the operation of the computing device 100. If, however, further processing is possible subsequent to setting the boot flag in block 630, processing continues to design block 635 where a determination is made whether corrective instructions are needed and available. If so, processing continues to block 640 where the device and/or component usage and system information is analyzed for parameters for corrective, executable instructions that are retrieved from the usage database 630. Next, in block 645 the corrective executable instructions and parameters are stored to a BIOS-accessible memory location such as component memory 320 or BIOS memory 220. If, however, in decision block 635 it was determined that corrective instructions are either not needed or are not available, processing continues to decision block 650 where a determination is made whether a corrective message should be set. If so, then in block 655 a corrective message is stored to a BIOS-accessible memory. If, however, in decision block 650 no corrective message is to be set, then with no instructions and with no message there is no need to interrupt the boot sequence and, accordingly, the incident boot flag 660 is cleared.

Figure 7:
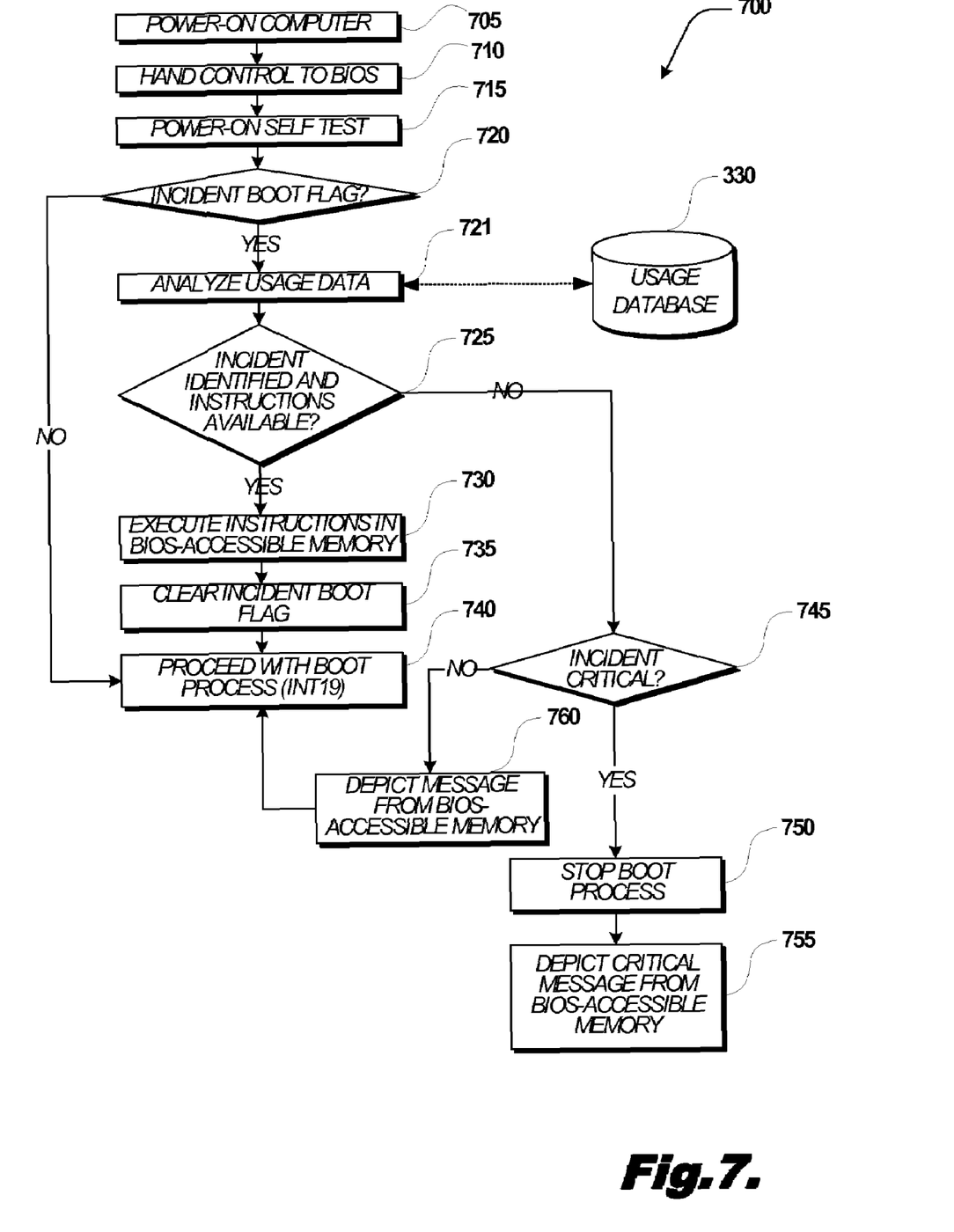
FIG. 7 illustrates an exemplary flow diagram of an alternate boot process in accordance with one embodiment.

In accordance with the usage monitoring embodiments of the present invention, FIG. 7 illustrates a usage data aware boot process 700. Process 700 begins at block 705 with the power on of the computing device 100. Next, in block 710 control of the computing device is handed to the BIOS and in block 715 the power on self test is initiated. Next, in decision block 720 a determination is made whether an incident boot flag is present. If no incident boot flag is present, processing proceeds to block 740 where the boot process continues uninterrupted. If, however, in decision block 720 it was determined to be present, processing proceeds to block 721 where usage data in a usage database 330 is analyzed. Next, in decision block 725 a determination is made whether the incident was identified and there are executable instructions available for responding to the incident. If so, then in block 730 the instructions are executed from a BIOS-accessible memory location and in block 735 the incident boot flag is cleared, after which, processing continues to block 740 and the boot process continues. If, however, in decision block 725 it was determined that either the incident was not identified or that instructions were not available then processing continues to decision block 745 where a determination is made whether the incident was a significant and/or critical incident. If so, in block 750 the boot process is stopped and in block 755 a critical message from BIOS-accessible memory is depicted for the computing device 100 (e.g., via display 140) thereby alerting the end-user to a critical incident on the computing device 100. Such a critical message may include further instructions for responding to the incident or may simply describe who to contact to respond to the incident.

If, however, in decision block 745 it was determined that the incident was not critical, then in block 760 a message is depicted from the BIOS-accessible memory providing appropriate notification to the end-user about the incident and/or any appropriate responses, after which processing proceeds to block 740 where the boot process proceeds as normal.

In view of the foregoing description, further illustrative embodiments are apparent. The incident client module 160 may be employed as part of a virus detection process with an integrated response at the BIOS level to thereby avoid operating system virus programs (or other malicious program, such as a "Trojan horse" or spyware).

Other illustrative embodiments may include a patch management system whereby an incident boot flag is set when a new patch (or other update) for an operating system(s) or application 170 (or even incident client module 160) is to be installed.

Although specific embodiments have been illustrated and described herein, a variety of alternate and/or equivalent implementations may be substituted for the specific embodiments shown and described without departing from the scope of the present invention. This application is intended to cover any adaptations or variations of the embodiments discussed herein. Therefore, it is manifested and intended that the invention be limited only by the claims and the equivalents thereof.

The embodiments of the invention in which an exclusive property or privilege is claimed are defined as follows:

1. A computing device, comprising:
   a processor;
   an operating system operated by the processor; and
   a BIOS operated by the processor, the BIOS containing executable instructions, and adapted to:
   check a BIOS-accessible incident flag independent of the operating system, when executed; and
   if said incident flag indicates an incident, respond to said incident independent of the operating system, wherein said response includes depiction of an incident relevant message retrieved from a BIOS-accessible memory.

2. The computing device of claim 1, further comprising the BIOS being adapted to check a boot continuation flag, and stop a boot process if said boot continuation flag indicates a boot stopping incident.

3. The computing device of claim 1, wherein at least some of said executable instructions are stored in a BIOS-accessible memory.

4. The computing device of claim 1, wherein said executable instructions are adapted to designate a memory of a separate computing device component for said incident flag.

5. The computing device of claim 1, wherein said executable instructions are adapted to provide corrective action appropriate to said incident.

6. The computing device of claim 1, further comprising a BIOS-accessible memory residing on a separate computing device component.

7. The computing device of claim 6, wherein at least some of said executable instructions reside on said BIOS-accessible memory of said separate computing device component.

8. The computing device of claim 6, wherein the separate computing device component is a bus-mastering device.

9. The computing device of claim 8, wherein at least some of said executable instructions reside in a memory of a networking component.

10. The computing device of claim 9, wherein the networking component is responsive to a wake-up signal to initiate a boot sequence on the computing device.

11. A computing device, comprising:
a processor;
a bus coupled to said processor;
a bus mastering component having a component memory and coupled to said bus; and
a BIOS containing executable instructions, and coupled to said bus, the execution instructions being adapted to:
detect, independent of an operating system, a BIOS-accessible incident flat;
obtain autonomic incident data from said component memory; and
respond to the obtained incident data during a boot sequence of the computing device, wherein said response includes depiction of an incident relevant message retrieved from the BIOS-accessible memory.

12. The computing device of claim 11, wherein the incident data comprises a component's usage data.

13. The computing device of claim 12, wherein said component memory further comprises at least one predetermined response to incident data.

14. The computing device of claim 13, wherein said at least one predetermined response comprises a message.

15. A method of responding to an autonomic incident in a computing device, the method comprising:
setting an incident boot flag in a BIOS-accessible location;
storing autonomic incident response data in a BIOS-accessible memory;
identifying, independent of an operating system, said incident boot flag during a boot sequence of the computing device; and
responding to said autonomic incident during a boot sequence of the computing device with said autonomic incident response data from said BIOS-accessible memory, wherein said responding comprises depicting said autonomic incident response data as human readable desplayed text.

16. The method of claim 15, wherein said responding comprises depicting audibly said incident response data.

17. The method of claim 15, wherein said identifying comprises comparing a predetermined incident identifier with a predetermined incident response identifier.

18. The method of claim 15, wherein said incident response data includes executable instructions for responding to said autonomic incident.

19. The method of claim 15, wherein said autonomic incident is a detection of a malicious program.

20. The method of claim 15, wherein said autonomic incident is a software update incident.

21. A computer-readable medium containing computer-executable instructions for responding to an autonomic incident in a computing device by:
setting an autonomic incident flag in a BIOS-accessible location storing autonomic incident response data including human readable response information in a BIOS-accessible memory;
identifying the autonomic incident independent of an operating system; and
responding to said autonomic response during a boot sequence of the computing device, wherein said responding comprises depicting said incident response data as human readable displayed text.

22. The computer-readable medium of claim 21, wherein said incident response data includes executable instructions for responding to said autonomic incident.

23. A system comprising:
a processor;
a bus coupled to said processor;
a disk drive coupled to said processor; and
a memory containing computer executable instructions, which when executed are operative to respond to an autonomic incident in a computing device by:
setting an autonomic incident flag in a BIOS-accessible location storing autonomic incident response data including human readable response information in a BIOS-accessible memory;
identifying the autonomic incident independent of an operating system; and
responding to said autonomic response during a boot sequence of the computing device, wherein said responding comprises depicting said incident response data as human readable displayed text.

24. The system of claim 23, wherein said incident response data includes executable instructions for responding to said autonomic incident.

* * * * *